Oct. 4, 1966 W. J. ATKINSON ETAL 3,276,347
BALL NOZZLE AND VALVE ARRANGEMENT
Filed Aug. 31, 1964
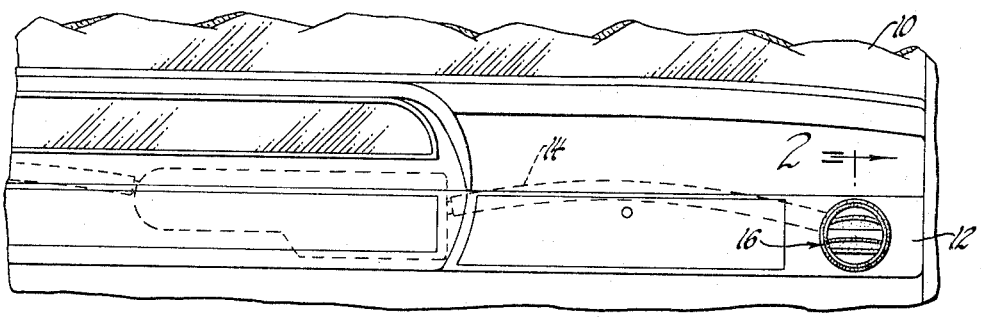
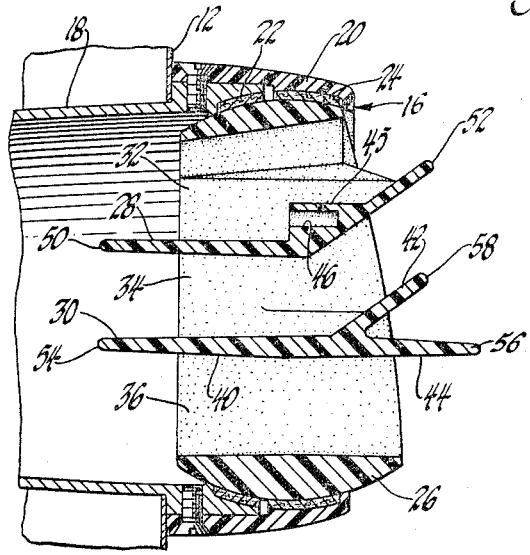
Fig. 2
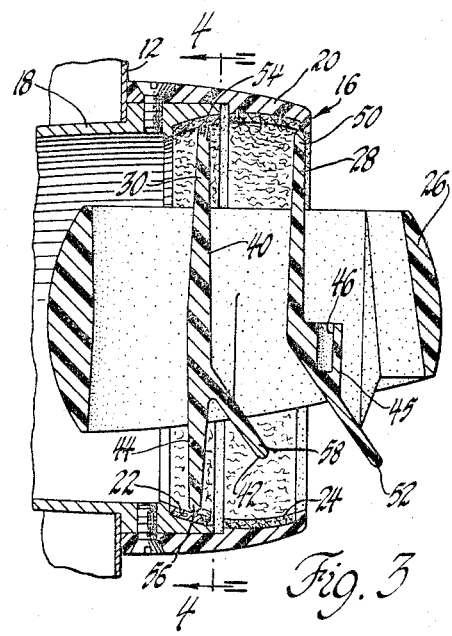
Fig. 3
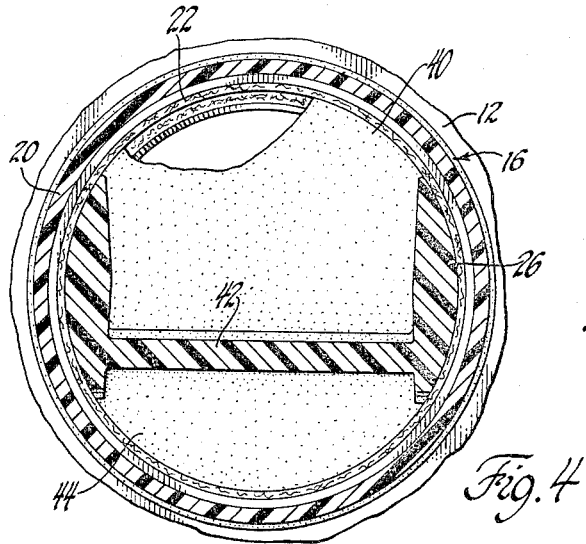
Fig. 4
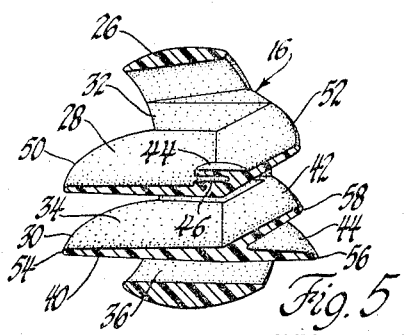
Fig. 5
INVENTORS
Ward J. Atkinson
& John Snyder
BY George E. Johnson
ATTORNEY

United States Patent Office

3,276,347
Patented Oct. 4, 1966

3,276,347
BALL NOZZLE AND VALVE ARRANGEMENT
Ward J. Atkinson, Farmington, Mich., and John Snyder, Lockport, N.Y., assignors to General Motors Corporation, Detroit, Mich., a corporation of Delaware
Filed Aug. 31, 1964, Ser. No. 393,027
3 Claims. (Cl. 98—2)

This invention relates to air discharge nozzles and more particularly to universally movable nozzle arrangements for controlling and directing the flow of air for ventilation or air conditioning of spaces such as vehicle passenger compartments and each arrangement including vanes adapted to control the divergence and directions of flow with one vane being adapted to control the extent of flow.

Air conditioning outlets for diffusing or deflecting the flow of air in automobiles have been widely used and examples of such nozzles are disclosed in the United States Patent 3,103,155, granted September 10, 1963 in the names of H. W. Boylan and E. E. Haight, and also in the British Patent 571,761 entitled Improvements in or Relating to Ventilators with the acceptance date of September 7, 1945. The nozzle arrangement as disclosed in the first mentioned patent has been found to be extremely satisfactory but that arrangement necessitated a separate valve or damper for controlling or stopping the air flow. As for the British patent teaching, the nozzle disclosed would give a diffused air distribution of a sort and the flow could be shut off without using a separate valve but the diffusion could not be within a range of a sufficiently wide angle to meet the requirements of automotive use.

An object of the present invention is to provide an improved air discharge nozzle which would provide adequate wide angle diffusion insofar as directing the air is concerned and at the same time would eliminate the need for a separate valve or damper to shut off or control the extent of air flow.

A feature of the invention is a sphere segment having at least two vanes, one of which is V-shaped and another which conforms with the contour of the sphere to act as a shut-off valve.

This and other important features of the invention will now be described in detail in the specification and then pointed out more particularly in the appended claims.

In the drawings:

FIGURE 1 is an elevation view of a portion of an automobile instrument panel one nozzle arrangement being shown thereon as an embodiment of the present invention;

FIGURE 2 is an enlarged sectional view taken along the line 2—2 in FIGURE 1 with the nozzle arrangement open for a diffused horizontal and upward discharge of air;

FIGURE 3 is a view similar to that of FIGURE 2 but with the nozzle so adjusted as to act as a valve in completely shutting off the air flow;

FIGURE 4 is a sectional view looking in the direction of the arrows 4—4 in FIGURE 3; and FIGURE 5 is a sectional and perspective view of a sphere segment making up the main portion of the nozzle arrangement of FIGURES 1 to 4.

In FIGURE 1, a windshield 10 is depicted over an automobile instrument panel 12 and dotted lines at 14 show a conduit as the immediate source of air conditioning air being led to a ball nozzle and valve arrangement 16 mounted at the righthand end of the panel 12 and facing the vehicle passenger compartment.

In FIGURES 2 and 3, an outlet duct for air is shown at 18. It will be understood that one end of this duct is connected by means not shown to the conduit 14.

Fixed to the other end of the duct 18 is an annulus 20 for retaining two rings of felt 22 and 24 frictionally to hold a sphere segment 26.

Two vanes 28 and 30 cooperate with the segment 26 in defining multiple passages 32, 34, and 36 extending through the segment 26. The vane 28 is V-shaped. The vane 30 has two parts 40 and 42 which, taken together, conform substantially with the V-shape of the vane 28. Because of the V-shapes of the two cooperating vanes, it is obvious that the air passing through the segment may be deflected at a wider angle than otherwise would be possible. The vane 30 has a third part 44 which extends in the same direction or in the same plane as that of the part 40 and assures a straight through flow of air by way of the passage 36 when such is required. The vane 28 also has a protuberance 45 with a recess 46 therein. The protuberance and recess are not essential but have been found to be extremely useful in holding the segment during chrome plating operations. The ultimate product may be made very attractive by chrome plating the spherical surfaces of the segment including the edges of the vanes. Interior surfaces of the segment including the flat surfaces of the vanes 28 and 30 are preferably made a dull black and this forms a very attractive contrast with the chrome plating. The opposite and extended edges 50 and 52 of the V-shaped vane 28 conform with the diametrical or spherical configuration of the segment 26. The same may be said about the edges 54 and 56 of the vane 30. The edge 58, however, which is on the vane part 42, terminates short of the diametrical configuration of the segment and this is helpful to an operator in properly grasping the segment with his fingers for adjusting it to a desired rotated position in selecting the direction of air discharge.

From the above, it may be seen that the outlet arrangement disclosed is extremely simple and yet it gives a wide angle selectivity for air discharge direction and no separate valve is essential if the air is to be shut off from flow through that particular nozzle. In automotive use, it is sometimes desirable to confine or concentrate the discharge of air conditioning air to the vicinity of the driver only and this may be done by merely properly rotating the righthand sphere segment to close it and to turn the lefthand segment to open the latter.

We claim:
1. A ball nozzle and valve arrangement for selectively directing or terminating the flow of air into space, said arrangement comprising a support defining an outlet socket connected to a duct, a sphere segment universally movable in said socket, two vanes fixed within said segment and cooperating with said segment in defining multiple passages extending through said segment, the peripheries of said vanes conforming with the diameter of said segment and thereby being adapted to cooperate with said socket in controlling the extent of air flow through the said passages, one of said vanes being V-shaped, the other of said vanes having two flat portions together forming a V-shape substantially conforming with that of the said one vane, one of said two flat portions terminating short of the said segment diameter, and the said other vane having a third flat portion extending in the same plane as the other of said two flat portions.

2. A ball nozzle and valve arrangement comprising a support defining an outlet socket, a sphere segment universally movable in said socket, multiple vanes cooperating with said segment in defining multiple passages individually extending through said segment, some of the edges of said vanes conforming with the diameter of said segment, one of said vanes being V-shaped and at one side of the center of said segment, one other of said vanes being at the other side of the center of said segment and having two flat portions together forming a V-shape similar to the shape of said one vane, and a third flat portion of said one other vane being in the same plane as one of said two flat portions.

3. A ball nozzle and valve arrangement comprising a support in the form of an air outlet socket, a sphere segment frictionally held in said support for manual rotation, at least two vanes cooperating with and extending outside opposite sides of said segment to define multiple passages through said segment, one of said vanes being V-shaped with opposite edges conforming with the diametrical configuration of said segment, the other of said two vanes having portions together conforming with the V-shape of said one vane and another portion having an edge with a radius the same as that of the segment, and the arrangement being such that rotation of said segment with respect to said support is adapted to close off any of said multiple passages.

References Cited by the Examiner

UNITED STATES PATENTS 3,103,155 9/1963 Boylan _____ 98—40

FOREIGN PATENTS 571,761 9/1945 Great Britain.

MEYER PERLIN, *Primary Examiner.*